(12) United States Patent
Wolfe et al.

(10) Patent No.: US 8,508,374 B1
(45) Date of Patent: Aug. 13, 2013

(54) MOTOR POWER MODULE

(75) Inventors: Aaron R. Wolfe, Ashland, OH (US); William D. Chandler, Jr., Ashland, OH (US); Louis R. Calkins, Pinckney, MI (US)

(73) Assignee: SJE-Rhombus, Detroit Lake, MN (US)

( * ) Notice: Subject to any disclaimer, the term of this patent is extended or adjusted under 35 U.S.C. 154(b) by 374 days.

(21) Appl. No.: 12/824,954

(22) Filed: Jun. 28, 2010

Related U.S. Application Data (60) Continuation-in-part of application No. 12/340,703, filed on Dec. 20, 2008, now Pat. No. 7,746,237, which is a division of application No. 11/610,968, filed on Dec. 14, 2006, now Pat. No. 7,471,207, which is a division of application No. 11/279,094, filed on Apr. 7, 2006, now Pat. No. 7,151,459, which is a division of application No. 10/711,602, filed on Sep. 28, 2004, now Pat. No. 7,075,443.

(60) Provisional application No. 60/507,249, filed on Sep. 29, 2003.

(51) Int. Cl.
*G08B 21/00* (2006.01)

(52) U.S. Cl.
USPC .............................. 340/618; 340/525; 341/33

(58) Field of Classification Search
USPC .......... 340/618, 612, 620, 525, 562; 341/20, 341/21, 33; 700/17; 318/786
See application file for complete search history.

(56) References Cited

U.S. PATENT DOCUMENTS

| | | |
|---|---|---|
| 4,084,547 A | 4/1978 | Deziel |
| 4,237,421 A | 12/1980 | Waldron |
| 4,496,895 A | 1/1985 | Kawate et al. |
| 4,604,563 A | 8/1986 | Min |
| 4,622,506 A | 11/1986 | Shemanske et al. |
| 4,658,195 A | 4/1987 | Min |
| 4,670,697 A | 6/1987 | Wrege et al. |
| 4,719,399 A | 1/1988 | Wrege |
| 4,751,449 A | 6/1988 | Chmiel |
| 4,751,450 A | 6/1988 | Lorenz et al. |
| 4,782,278 A | 11/1988 | Bossi et al. |
| 4,804,901 A | 2/1989 | Pertessis et al. |
| 4,820,964 A | 4/1989 | Kadah et al. |
| 4,843,295 A | 6/1989 | Thompson et al. |
| 5,153,572 A | 10/1992 | Caldwell et al. |
| 5,206,573 A | 4/1993 | McCleer et al. |
| 5,212,436 A | 5/1993 | Nacewicz et al. |
| 5,296,795 A | 3/1994 | Dropps et al. |
| 5,559,418 A | 9/1996 | Burkhart |
| 5,589,753 A | 12/1996 | Kadah et al. |
| 5,598,080 A | 1/1997 | Jensen et al. |
| 5,661,462 A | 8/1997 | Shrewsbury-Gee |
| 5,883,487 A | 3/1999 | Rosenzweig et al. |

(Continued)

*Primary Examiner* — John A Tweel, Jr.
(74) *Attorney, Agent, or Firm* — Christopher L. Parmelee; Walker & Jocke (57) ABSTRACT

A motor power module is provided that includes a control board mounted to the terminals of a relay. The control board includes a control circuit with a processor. The processor is operative to monitor a level of current supplied by the control circuit to at least one windings terminal connected to a single phase AC motor. The processor is responsive to monitored level of current corresponding to a predetermined level to cause the control circuit to remove a supply of electrical power from a start capacitor of the start windings of the motor while the control circuit continues to supply electrical power to the run windings of the motor.

30 Claims, 8 Drawing Sheets

(56) References Cited

U.S. PATENT DOCUMENTS

| | | | |
|---|---|---|---|
| 5,973,473 A | 10/1999 | Anderson et al. | |
| 5,973,608 A | 10/1999 | McMahon | |
| 6,005,483 A | 12/1999 | West | |
| 6,034,503 A | 3/2000 | Pertessis | |
| 6,051,952 A | 4/2000 | Moreira et al. | |
| 6,160,372 A | 12/2000 | Cusack | |
| 6,320,348 B1 | 11/2001 | Kadah | |
| 6,443,005 B1 | 9/2002 | Chandler, Jr. | |
| 6,570,359 B2 | 5/2003 | Dubhashi | |
| 6,595,051 B1 | 7/2003 | Chandler, Jr. | |
| 6,756,756 B1 | 6/2004 | Chmiel et al. | |
| 6,970,079 B2 | 11/2005 | Sabatino | |
| 7,075,443 B1 | 7/2006 | Chandler et al. | |
| 7,095,207 B1 | 8/2006 | Min | |
| 7,151,459 B1 | 12/2006 | Chandler et al. | |
| 7,183,741 B2 | 2/2007 | Mehlhorn | |
| 7,196,491 B2 | 3/2007 | Mayhew et al. | |
| 7,202,627 B1 | 4/2007 | Min | |
| 7,471,058 B2 | 12/2008 | Duarte et al. | |
| 7,471,207 B1 * | 12/2008 | Chandler et al. | 340/618 |
| 7,489,484 B2 | 2/2009 | Keener | |
| 7,518,837 B2 | 4/2009 | Tseng et al. | |
| 7,652,440 B2 | 1/2010 | Singh | |
| 7,746,237 B1 * | 6/2010 | Chandler et al. | 340/618 |
| 8,004,231 B2 | 8/2011 | Gonthier et al. | |

* cited by examiner

MOTOR POWER MODULE

CROSS REFERENCE TO RELATED APPLICATIONS

This application is a continuation-in-part of U.S. application Ser. No. 12/340,703 filed Dec. 20, 2008 (now U.S. Pat. No. 7,746,237), which is a divisional of U.S. application Ser. No. 11/610,968 filed Dec. 14, 2006 (now U.S. Pat. No. 7,471,207), which is a divisional of U.S. application Ser. No. 11/279,094 filed Apr. 7, 2006 (now U.S. Pat. No. 7,151,459), which is a divisional of U.S. application Ser. No. 10/711,602 filed Sep. 28, 2004 (now U.S. Pat. No. 7,075,443), which claims benefit of U.S. Provisional Application Ser. No. 60/507,249 filed Sep. 29, 2003, all of which applications are hereby incorporated herein by reference.

BACKGROUND

It is often desirable to know information about liquid levels in reservoirs. Determining liquid levels in reservoirs, such as in sewage tanks, wells, water cisterns or tanks, and other liquid storage vessels, whether enclosed or open and exposed to the environment, has been done in a number of ways. For example, in tanks that are visually accessible, an operator may periodically take visual readings of the liquid level.

Visual readings, however, are often not desirable in systems where an automatic response is required when the liquid level reaches a certain threshold. In such cases the activation of a pump or valve may be necessary to move more liquid into the reservoir or to discharge liquid from the reservoir. In systems where visual readings are not available or when an immediate response is required, control systems are typically employed that are responsive to a liquid level indication. Such control systems may illuminate a light on an indicator panel representing the liquid level and/or trip an audible alarm to notify a human operator that corrective action is required.

Examples of liquid level sensing devices for use with wastewater reservoirs or other liquid holding vessels are discussed in U.S. Pat. No. 6,595,051 of Jul. 22, 2003 and U.S. Pat. No. 6,443,005 of Sep. 3, 2002 which are both incorporated by reference herein.

Different types or configurations of reservoirs often require different types or configurations for control systems associated with the reservoirs. For example, some reservoirs may have one pump while other reservoirs have more than one pump which are capable of moving liquids out of the reservoir. In addition, some reservoirs may include liquid level sensing devices in the form of mechanical floats positioned at various levels in the reservoir, while other reservoirs may use liquid level sensing devices such as a pressure bell located at the bottom of the tank, such as shown in U.S. Pat. No. 6,595,051.

Wastewater control systems are often designed to cause one or more pumps to start pumping liquid out of a reservoir responsive to the level of liquid in the reservoir. It is often desirable to use pumps with single phase motors for this purpose. Because single phase motors do not have multiple phases, to begin rotation, start windings and start capacitors (herein after referred to as the start circuit) are typically required to increase motor torque and achieve motor acceleration. Historically, this has been achieved with the use of a potential relay that energizes when the motor start winding generates enough voltage potential, which is based on motor rotational speed. In response to the potential relay energizing, the relay can be configured to drop out (e.g., remove power from) the start circuit. Because start capacitors operate in series with the start winding, the relay that controls power to the start circuit must open at the correct time so that the voltage does not build too high and blow up the start capacitor. Thus, to increase the reliability and safety of such control systems, there exists a need for a control system which can reliably prevent start capacitors from being damaged and causing damage.

SUMMARY

The following is a brief summary of subject matter that is described in greater detail herein. This summary is not intended to be limiting as to the scope of the claims.

Described herein are various technologies relating to control systems for single phase AC motors used in applications such as pumps. Such systems may be used in liquid level sensing and control systems and methods for wastewater systems.

In an example embodiment, the system may include a motor power module having a main circuit board that is mounted in supporting connection with the terminals of a contactor type relay and has a size that generally corresponds to cross-sectional area of the relay.

The circuit board is operatively configured with a control circuit that is operative to start and run a motor. Such a motor may be included in a pump that is operative to pump liquids out of a reservoir in wastewater system. The circuit board may also be adapted for use with other applications of a single phase AC motor (e.g., heating and cooling equipment). In an example embodiment, the control circuit includes a processor that is operatively configured to activate the relay to provide AC electrical power to the start and run windings of the motor. The control circuit mounted to the relay may also include a user interface for configuring and operating the motor power module.

The control circuit may include an overload device that is operative to measure the level of current in the portion of the circuit used to power the windings of the motor, and calculate an overload value from that measurement. When the overload value increases to a predetermined level, the processor is operative to cause the control circuit to deactivate the motor windings. In example embodiments, the predetermined level may be user selectable to correspond to the level of current which is equal to the motor manufacturer's full load current rating for the motor.

The processor may also be operatively configured to monitor the measured current for the motor as the motor is being started. When the current falls to a predetermined level, the processor is operative to cause the control circuit to deactivate a start circuit (including a start capacitor and the start windings of the motor). In example embodiments, the predetermined level may be chosen to correspond to the level of current at which the motor should reach a desired level of speed which is less than full operating speed.

Also, in example embodiments, the processor may be operatively configured to monitor the usage of the start capacitor. In addition to deactivating the start circuit responsive to a motor current measurement, the processor may further deactivate the start windings when the usage of the capacitor reaches a predetermined level. This predetermined level may be chosen based on determined and calculated usage characteristics of the start capacitor (e.g., how long it has been activated, how hot it has become).

In example embodiments, the processor may be operatively configured to monitor the sinusoidal changes in the current of the portion of the circuit powering the run windings of the motor of the pump through use of the overload device.

To reduce wear on the contact relay when the pump is started and stopped, the processor may be operatively configured to time the point when the relay opens or closes the circuit for the run windings to correspond to (or substantially correspond to) the cross-over point or zero power point of the sinusoidal change in current or voltage in the portion of the circuit powering the run windings. For example, the processor may cause the relay to power the run windings and/or remove power from the run windings responsive to the current or voltage of the circuit being within a predetermined amount of time before or after the cross-over point for the AC circuit. In an example embodiment, the predetermined amount of time may, for example, be about 1 millisecond. In further examples, other predetermined amounts of time relative the cross-over point may be chosen to minimize electrical arc when the relay opened, but still permit some electrical arc in order to clean electrical contacts in the relay.

Other aspects will be appreciated upon reading and understanding the attached figures and description.

DETAILED DESCRIPTION

Various technologies pertaining to power modules for single phase AC motors will now be described with reference to the drawings, where like reference numerals represent like elements throughout. In addition, a schematic diagram of an example system is illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
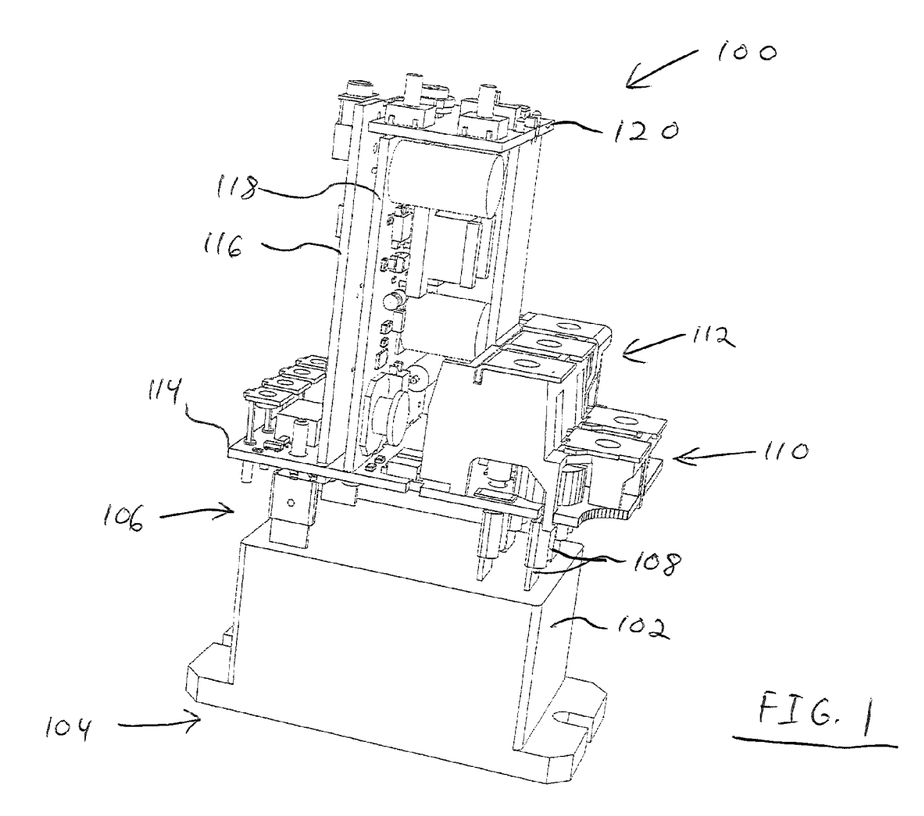
FIG. 1 is a perspective view of an example motor power module that facilitates operating a single phase AC motor.

With reference to FIG. 1, a perspective view of an example motor power module 100 (MPM) that facilitates operating a single phase AC motor is illustrated. The MPM 100 includes a contactor type relay 102 (referred to herein as a relay) which is operative for use with switching on/off power to a single phase AC motor. For example, the MPM 100 may include a relay capable of operating a 1-5 HP motor at 6-30 amps and 230 VAC. An example relay for use with the described MPM 100 may include a IEC contactor such as a Square D (Telemecanique) RPF2AJD. However, it is to be understood that example embodiments may be used with other types and sizes of relays based on the electrical and environmental requirements for the particular application involved with the MPM. Also as defined herein the term "relay" corresponds to an electronically controlled switch which may include both electromagnetic/mechanical type contactor relays as well as fully electronic switches.

As shown in FIG. 1, the relay includes a base end 104 and an opposed terminal end 106. The base end may be adapted for mounting to a support surface. The terminal end typically includes a plurality of terminals 108, which in this example extend outwardly therefrom.

In an example embodiment, the MPM 100 includes at least one control board 110 mounted to the relay 102. The at least one control board includes a control circuit with a processor (generally indicated with reference numeral 112), which circuit and processor are operatively configured to operate the relay 102 to control the operation of a single phase AC motor. In the example shown in FIG. 1, the at least one control board includes a control circuit that extends over four interconnected circuit boards (114, 116, 118, 120) that are mounted together to form the at least one control board that is mounted in supporting connection with the terminals 108 of the relay. However, it is to be understood that alternative embodiments of the at least one control board may include a single circuit board and or other numbers of boards to which the control circuit is mounted.

In example embodiments, the cross-sectional area (X and Y axis) of the at least one control board generally corresponds to the cross-sectional area of the relay to which it is mounted. Further, it should be appreciated that because the at least one control board is mounted on top of the relay, additional functionality can be added to the MPM 100 by increasing the vertical height (Z axis) of the at least one control board, without increasing the width and thickness (X and Y axis) of the MPM. As a result, the MPM uses space efficiently and minimizes the amount of surface area needed to mount both a relay and a control board for an application that requires control over a motor. Also it should be appreciated that in this described packaging, the relay is adapted to be mounted adjacent a support surface rather than the control board. Thus the relay itself is operative to directly support the control board, rather than having the control board support the relay.

Figure 2:
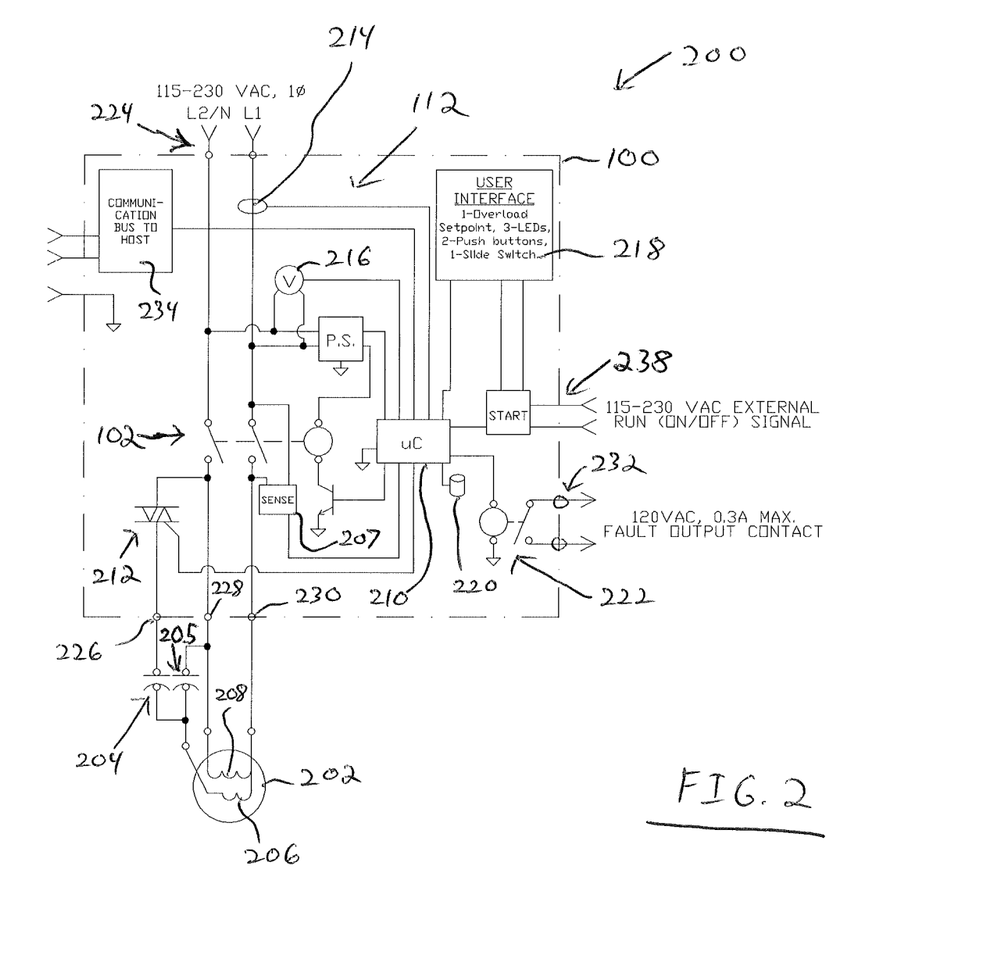
FIG. 2 is a schematic diagram of an example control circuit of the motor power module.

FIG. 2 shows a schematic view 200 of the MPM 100 in operative connection with a single phase AC motor 202, start capacitor 204, and run capacitor 205. Such a single phase AC motor typically includes start windings 206 and run windings 208. The start windings 206 and start capacitor 204 are used to accelerate the motor, whereas the run windings 208 and run capacitor 205 power the motor at the motor's normal operating speeds.

Here the control circuit 112 may include a processor 210 that is operative to cause the relay 102 to open and close the portion of the circuit which provides current to activate the start and run windings of the motor. In an example embodiment, the start capacitor 204 operates in series with the start windings 206.

In an example embodiment, the control circuit 112 may include at least one sensor (also referred to herein as an overload device) 214 which is operative to measure electrical levels (e.g., current and/or voltage) of the AC circuit which powers the run windings, start windings or both of the motor. The processor 210 may monitor the measured levels by the overload device 214 to determine when to take various actions with the MPM. Such actions may include: turning the motor off in response to an overloaded condition; deactivating the start circuit after the motor has reached sufficient speed; temporarily activating the start circuit to provide boosting, and temporarily deactivating the start circuit based on usage.

For example, the MPM may include a user configurable overload level of current which corresponds to the maximum level of current that the MPM should allow the motor to operate. The motor may experience an overload level under heavy loads (such as a clogged pump). When the processor detects this overload level, the processor is operative to open the relay 102 and stop the motor from running.

As discussed previously, the start windings are used to accelerate the single phase AC motor such as when starting the motor from a stopped condition. As the motor accelerates, the voltage induced on the start winding which is applied to the start capacitor increases. To prevent the start capacitor from being damaged, the processor 210 is operative to deactivate the start windings 206 and start capacitor 204 (referred herein as a start circuit) via operation of a triac 212 before the motor reaches full speed. To accomplish this, the processor is operative to monitor the amount of current (via the overload device 214). When the processor determines that the measured level of current drops to a predetermined level, the processor may be operatively programmed to cause the triac 212 to remove power from the start circuit.

In an example embodiment, the predetermined level of current which triggers the start circuit to be deactivated may correspond to a current level at which the motor reaches 75 percent of full speed for example. Also, in an example embodiment, the processor may be operatively programmed to determine the peak in rush of current when the motor is first being started. The predetermined level of current which triggers the start circuit to be deactivated may be calculated by the processor to corresponds to a percentage (e.g., 25%) of this determined peak in rush of current. However, it is to be understood that in alternative embodiments, other predetermined levels of current and/or speed may be chosen for when to deactivate the start circuit depending on the characteristics of the capacitors and motors used for an application of the MPM. Also, it should be appreciated that in further alternative embodiments, monitored levels of voltage may also be used to determine when the processor operates to deactivate the start circuit.

In addition to starting a motor from a stopped condition, the described start circuit may also be activated by the control circuit to provide boosting to the motor when the motor is experiencing heavy load. In an example embodiment, the processor 210 may be configured to detect that the current to the run windings (detected via the overload device 214) has increased to at least a load trigger point indicative of when the motor is under heavy load. When the load trigger point is reached (or exceeded), the processor 210 may be operative to cause the control circuit to switch to a state that provides power to the start circuit of the motor in order to boost the overall horse power of the motor.

For example, in a wastewater application, the processor may be configured to provide a boost to the motor (via powering the start circuit) when the current in the run windings corresponds to a level indicative of a drop of about 15 percent in the normal flow rate (GPM) of liquid in the pump that the motor operates. In this described example, the load trigger point may correspond to an increase in current of about 15% or other level indicative of a decrease in motor speed which boosting may be desirable.

The processor may also be operative to detect (via the overload device 214) when the current returns to a normal operating level below the load trigger point (indicative of the absence of heavy load) and operate the control circuit to remove power from the start circuit. In an example embodiment, the processor may be operative to provide boosting by pulsing the start circuit. For example each pulse may last 10 AC cycles. The processor may then operate to measure the current (via the overloaded device) between pulses to determine if the boosting is still needed and/or to vary the boosting duty cycle (e.g. the number of pulses per given amount of time) based on how much boosting may be needed.

In an example embodiment, the processor 210 may be operatively configured to base operation of the start circuit on determined usage characteristics of the start capacitor 204. For example, the processor may operate the start circuit responsive to the monitored/calculated usage characteristics of the start capacitor, to ensure that that capacitor is operated in a temperature range that will decrease the likelihood of the capacitor failing (e.g., exploding).

For example, the processor may calculate and/or measure usage information which is indicative of temperatures associated with the start capacitor. If the usage information exceeds predetermined levels, the processor may be operative to temporarily deactivate the start capacitor in order to allow the capacitor to cool down. For example, such usage information may correspond to the amount of time the start capacitor is activated. In this example, the processor may be operatively configured to determine the amount of time that has elapsed since the processor caused control circuit to provide power to start circuit (i.e., start capacitor and start windings) during the initial start of the motor and/or during use of the start circuit for boosting.

When the amount of time that has elapsed has reached a predetermined amount of time, the processor may be operative to deactivate the start circuit. In an example embodiment, the predetermined amount of time may correspond to about 1-3 seconds, for example. Also, in this example, the processor may also be operative to monitor the amount of time that has elapsed since the start circuit was deactivated. When the start circuit has been deactivated for a predetermined amount of time (i.e. to cool the start capacitor), the processor may be operatively configured to reactivate the start circuit again to continue starting or boosting the motor.

Also, it should be appreciated that other measured usage characteristics (other than usage time) of the start capacitor 204 may be used to base when to deactivate and reactivate the start circuit. For example, the processor may be operative to monitor voltage across and current through the start capacitor to determine usage characteristics to trigger deactivating/reactivating the start circuit. Also further embodiments may include a temperature sensor adjacent the start capacitor in order to supply direct temperature readings of the start capacitor to the processor for use when determining when to deactivate/reactivate the start circuit.

In an example embodiment, the control circuit may include sensors (such as the overload device 214 and/or a voltage sensor 216) that monitor the sinusoidal changes of the current/voltage in the AC circuit powering the windings of the motor of the pump. The processor 210 may be operatively configured to time the point when the relay 102 closes the circuit for the motor windings to correspond to (or substantially correspond to) the cross-over point or zero power point of the sinusoidal change in voltage in the AC circuit (i.e., The cross-over point corresponds to when the alternating current switches directions).

In example embodiments, the processor may be operative to time the point when the contact relay opens the circuit for the run windings to correspond to (or substantially correspond to) the cross-over point or zero power point of the sinusoidal change in current in the AC circuit. For example, the processor may cause the relay to power and/or remove power from the run windings responsive to the current or voltage of the AC circuit being within a predetermined amount of time before or after the cross-over point for the AC circuit. In an example embodiment, the predetermined amount of time may, for example, be about 1 millisecond.

In an example embodiment, operating the contact relays within a predetermined amount of time of the cross-over point for the AC circuit may reduce the amount of wear (caused by arcing) on the contact relay and may enable the use of a relatively smaller and relatively less expensive relay to control power to the run windings of the motor. However, it should be appreciated that example embodiments may use a predetermined amount of time relative the cross-over point that is greater than 1 millisecond, in order to produce a small electrical arc in the relay that cleans oxidation off of contacts in the relay.

In addition, the processor 210 may be operatively configured to monitor electrical responses of the relay 102 and other parameters (such as ambient temperature) to determine operational characteristics of the relay. The processor may operate the control circuit responsive to the monitored/calculated characteristics of the relay, to ensure that the relay operates in a manner that accurately opens (and closes) within the desired ranges of the zero cross point. For example, the processor may monitor the voltages and current associated with the terminals of the relay in response to a signal by the processor the open the relay. The processor may be operative to calculate the operation delay between the triggering of the relay to open and the time the relay actually opens (as measured via sensor 207). Responsive to this determined delay, the processor may be operative to optimize the timing of the triggering of the opening of the relay to more closely coincide with the cross-over point of the AC current.

In addition, the processor may also be operative to determine the ambient temperature associated with the relay and/or MPM when it is operated. As can be appreciated, a relay's operational delay may vary depending on the temperature of the relay (which may vary widely such as between winter and summer seasons).

In an example embodiment, the processor may be operative to store a table in a data store 220, of determined operational delays and the temperature of the relay at the time the respective operation delays were determined. Prior to operating the relay, the processor may determine the current ambient temperature via sensor 207, and based on this temperature determine from the table a corresponding operation delay for the relay. The processor may then base the timing of the opening (or closing) of the relay relative the zero cross point of the AC circuit based on this expected operation delay retrieved from the data store for the current temperature.

For example, the processor may store in a table of the data store 220, maximum, middle, and minimum temperatures and associated operational delays for the relay 102. Such values may be updated and replaced with updated temperatures and operational delays on a continual basis. When the current ambient temperature is between temperature levels stored in the table, the processor may be operative to calculate an interpolated operational delay between the operational delays stored in the table. It should also be appreciated that alternative embodiments, may have more (or less) correlations between temperature and operational delay based on the desired accuracy in estimating the operation delay for the relay for a given temperature.

In addition, it should also be appreciated that the described circuit for timing the opening of a relay based on the determined cross-over point may be carried out in alternative embodiments of an MPM, that do not include features for controlling the described start circuit. For example, some applications may use single phase AC motors that include a start circuit in the motor itself. In such cases, the described control circuit may not include (or use) features (such as the triac 212) and associated programming in the processor related to the start circuit but, may include other aspects of the described circuit such as the described features for timing the opening of the relay to about coincide with the zero cross over point.

In addition, the processor 210 may be operatively configured to monitor and store (in the data store 220) historical operational data regarding the operation of the motor and MPM. For example, the processor may be operative to use the components of the control circuit to calculate the phase angle between current and voltage associated with the run windings of the motor to determine motor efficiency. The data indicative of motor efficiency (and other measured and calculated data) may be stored in the data store 220 for use with tracking pump health. The processor may also be capable of accessing the historical information in the data store and communicate the information to one or more other components local and external to the MPM (e.g., telemetry) for further evaluation of the motor's health and efficiency.

For example, in example embodiments, the processor may be operatively programmed to track and store in the data store the numbers and/or timings of opening and closings of the relay. Responsive to this data, the processor may be operative to determine when the start capacitor is at risk of failure, and activate an alarm or telemetry device to indicate maintenance is needed.

Figure 3:
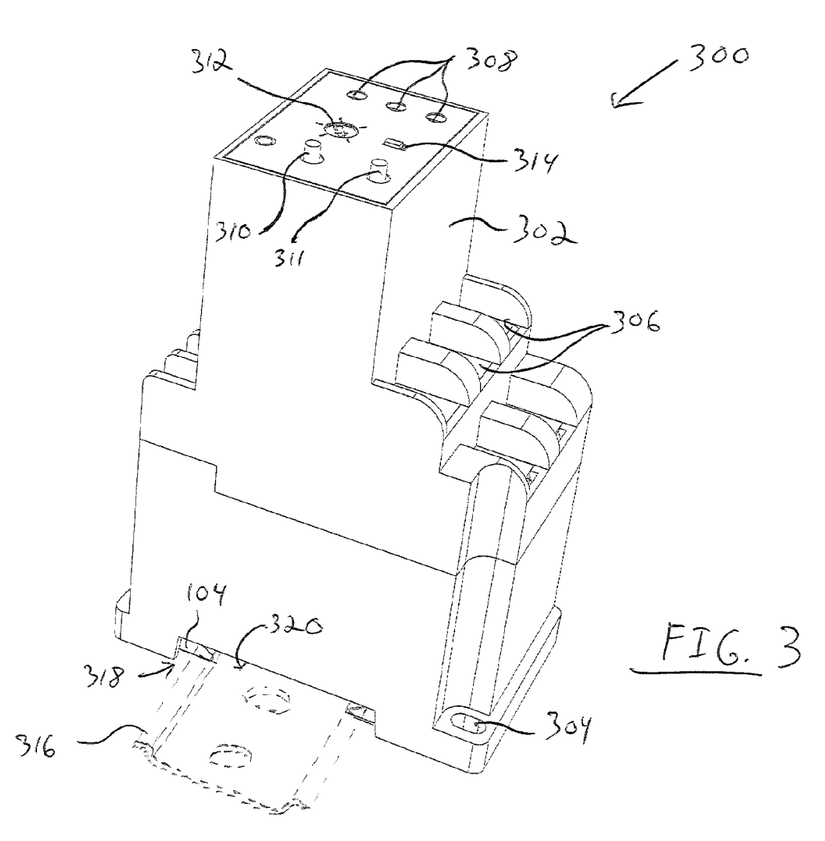
FIG. 3 is a perspective view of the example motor power module encased in an outer shell.

Referring now to FIG. 3, an example embodiment of an MPM 300 is illustrated which includes a shell 302 in surrounding relation about the previously discussed at least one control board and relay. Such a shell may include mounting holes 304 adapted to receive fasteners for fastening the MPM onto a support surface of a control panel/enclosure, such that the base 104 of the relay faces the support.

In addition, an alternative embodiment of the relay for use with the described MPM may include a channel 320 that is designed to receive a rail 316 in operative engagement therewith. To accommodate such a rail, an example embodiment of the shell 302 may include openings 318 in the sides of the shell adjacent the base of the terminal. Such openings may provide sufficient space adjacent the base of the relay for inserting the rail 316 into the channel 320 of the relay.

Referring back to FIG. 2, in an example embodiment, the control circuit may include a plurality of terminals. Such terminals may include power terminals 224 to connect electrical lines to a 230 VAC power supply. The control circuit may also include: a start capacitor terminal 226 to connect the start capacitor; a common windings terminal 230 to connect to electrical lines associated with both the start and run windings of a motor; and a run windings terminal 228 to connect to electrical lines associated with the run windings of the motor. As shown in FIG. 3, the shell may include openings 306 which are aligned with user accessible terminals on the control board of the MPM for use with mounting electrical lines thereto.

Figure 8:
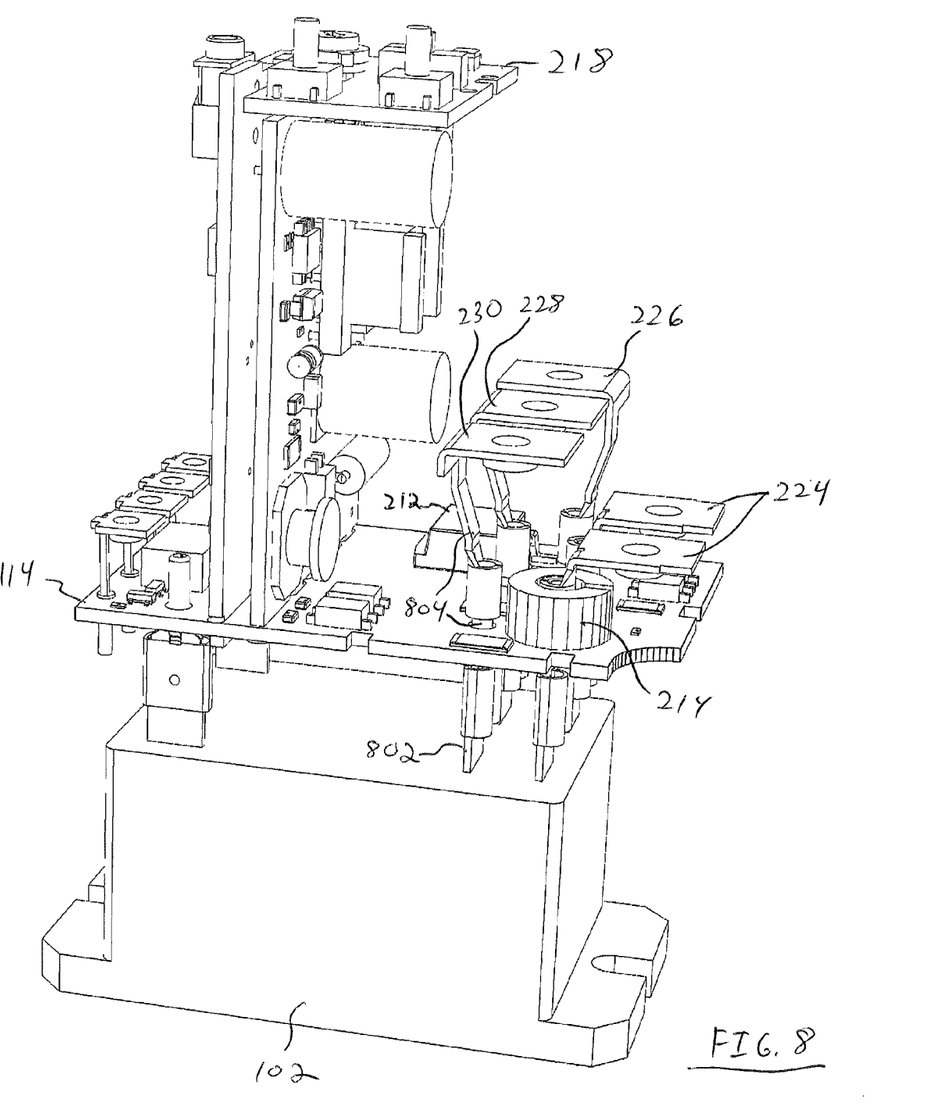
FIG. 8 is a further perspective view of the example motor power module shown in FIG. 1 showing relay terminals electrically extending through the control board.

In addition, it should be noted that in example embodiments, the terminals of the relay may be extended to project upwardly through portions of the control board to be in direct electrical connection with user accessible terminals of the MPM. For example as shown in FIG. 8, a terminal 802 of relay 102 may include a terminal extension 804 mounted thereto that projects upwardly transversely through control board 114 to a user accessible terminal 230. In this example, the user accessible terminal connected to relay terminal 802 corresponds to the common windings terminal 230 (shown in FIG. 2) to which the lines from each of the start and run windings are connected. However, it should be appreciated that additional terminals of the relay 102 that receive and output electrical power for operating the motor may be similarly extended upwardly transversely through the control board 114 so as to be directly electrically connected with user accessible terminals (e.g., power terminals 224, run windings terminal 228) which are orientated in vertical alignment with the location of the terminals on the relay.

Also, it should be appreciated that the control board may include additional circuits and/or terminals for use with controlling the operation of the control circuit. For example, as illustrated in FIG. 2, a portion of the control circuit 112 may include a user interface 218. As shown in FIG. 3, such a user interface may include output devices 308 (e.g., LEDs) visible through holes in the shell 302 for providing visual information regarding the operation of the control circuit. Such LEDs may indicate that: main power is on (e.g., with a green LED); the motor is running (e.g., with a yellow LED); and/or that an overload of the motor has occurred (e.g., with a red LED).

Also the user interface may include input devices 310, 311, 312, 314 extending through holes in the shell 302, which a user may manipulate to operate the control circuit. Such input devices may include a manual push button 310 that when pressed will activate the MPM and run the motor. Such input devices may include a DIP switch 314 that specifies manual or automatic reset from a fault condition detected by the processor (e.g., an overloaded motor). In addition, such input devices may include a push button 311 that resets a fault condition (which re-enables the MPM to operate the motor) when the DIP is set to manual reset.

Also, the input devices may include a dial 312 to which one of a plurality of triggering conditions or thresholds may be selected. For example, the dial may allow a user to select/input a particular motor overload threshold. As discussed previously, when the motor overload value (e.g. current) reaches or surpasses the selected/inputted motor overload threshold, the processor is operative to cause the control circuit to deactivate the motor windings to turn the motor off (and protect the motor of the pump from damage).

Referring back to FIG. 2, in an example embodiment, the control circuit may also include a relay (or a triac) 222 that is activated by the processor to turn on a powered fault alarm signal (external to the MPM and connected to terminals 232) responsive to the detection of a fault condition by the processor. Also, depending on the application involved for the MPM, the control board may include other terminals for connecting electrical connections for inputs and outputs that may be used by the processor.

For example in a wastewater system, the control board MPM may be associated with other circuits and boards which carry out other functions associated with the particular application. To communicate with other circuit boards, the described circuit 112 may include a communication bus to host interface 234 for communicating data between the processor 210 and an external processor or other circuit. Such an external processor or circuit may determine external information (e.g., a current depth level of a liquid) which is used to trigger when to cause the MPM to start the motor. Such a trigger to start or stop a motor may be provided through the described communication bus 234 and/or an external run signal port 238. Also, it should be appreciated that the MPM may provide information regarding the operation of the MPM, capacitors, relay, and motor to external processors or other circuits via the communication bust 234.

Figure 4:
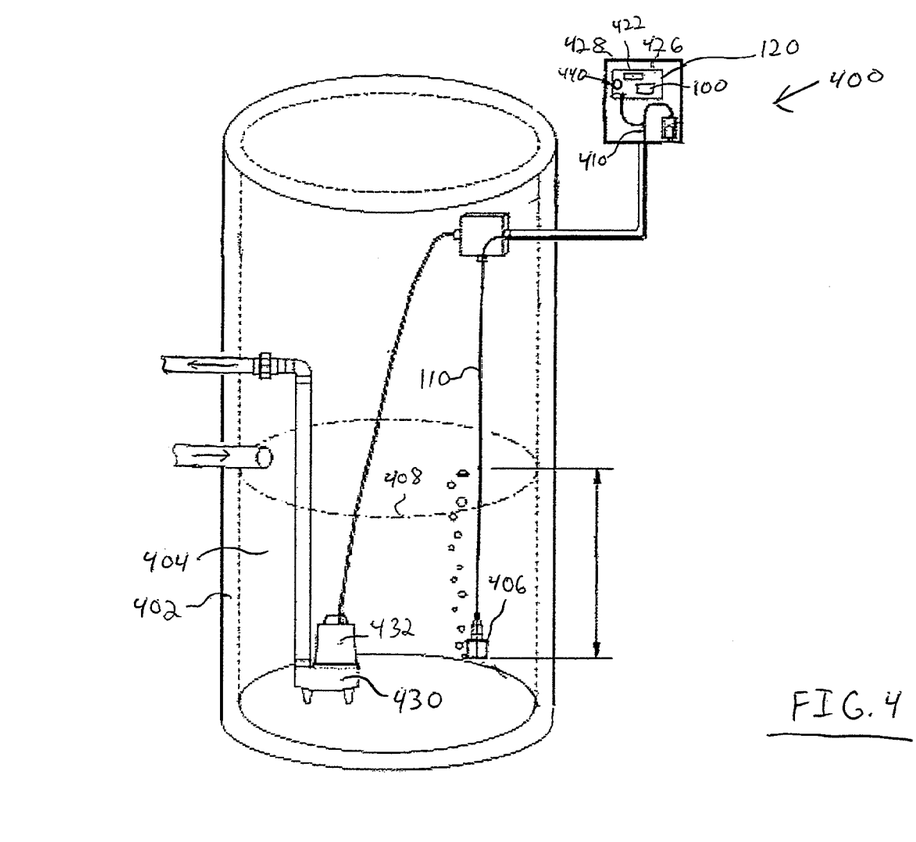
FIG. 4 is a perspective view of an example wastewater system that uses an example motor power module to control a motor of pump in a reservoir.

Referring now to FIG. 4, an example wastewater system 400 that uses an MPM 100 and that facilitates monitoring and control of a depth level of a liquid in a reservoir is illustrated. The system 400 includes a reservoir 402 capable of holding a liquid 404 therein. Such a liquid may include many different types of liquids and may include solids and semi-solids therein. For example, in a wastewater environment, the reservoir may correspond to a tank that is operative to hold a wastewater liquid including sewage from one or more dwellings. However, it is to be understood that the described systems may be used in other applications that require a depth level of a liquid to be monitored and adjusted (e.g., wells, cisterns, fountains, ponds, pools, or any other liquid-holding reservoir).

The example system 400 may include a depth level measurement device 406 such as an air bell mounted in the reservoir at a level that is typically below the upper surface level 408 of the liquid 404 in the reservoir. The example system 400 also includes a water resistant housing 428 (e.g., a control panel box) having the previously described MPM 100 mounted to an interior mounting/support surface 426 therein. The housing may also include a depth level control circuit 422 (typically mounted on at least one board and including one or more processors, input devices and output devices) that is operative responsive to the depth level measurement device to determine data that corresponds to the depth level of the liquid in the reservoir. For example, the depth level control circuit 422 may be connected to a tube 410 that is connected to the measurement device 406 in the form of an air bell. In such an example, the depth level control circuit 422 may include a pressure transducer (or other sensor) that is operative to produce electrical signals representative of the current level of pressure in the tube 410 (which pressure levels are indicative of the depth level of the liquid above the air bell). An example of such an air bell is shown in U.S. application Ser. No. 12/425,989 filed Apr. 17, 2009, which is hereby incorporated herein by reference in its entirety. Also it should be appreciated that the described wastewater system may use other types of depth level measurement devices such as mechanical floats and pressure bells.

In this described example, the processor of the power module 100 may be in operative connection with the depth level control circuit 422 via the previously described communication bus 234 and/or trigger port 238 (shown in FIG. 2). In the example system, the motor power module 100 may be operatively configured to be responsive to communications from the depth level control circuit to turn on and off the motor 432 of the pump 430 in order to change the depth level of the liquid 404 in the reservoir.

In this described embodiment, the depth level control circuit may be in operative connection with at least one alarm output device 440. Such devices may correspond to a local alarm output device that is included in the housing 428. Also, the alarm output device 440 may correspond to a remote alarm located remotely (e.g., in another room or building) from the housing 428.

Examples of alarm output devices may include a visible light emitting device (e.g., a flashing light or other device operative to emit a visible light signal) and/or a sound output device (e.g., a siren or other device operative to emit an audible sound signal). The depth level control circuit may include a processor that is programmed or otherwise configured to cause the one or more alarm output devices to turn on and off responsive to the determined levels of the liquid in the reservoir measured via the depth level measurement device 406 and/or responsive to other conditions and/or inputs provided (or determined by) the MPM (such as an overloaded condition of the motor).

Figure 5:
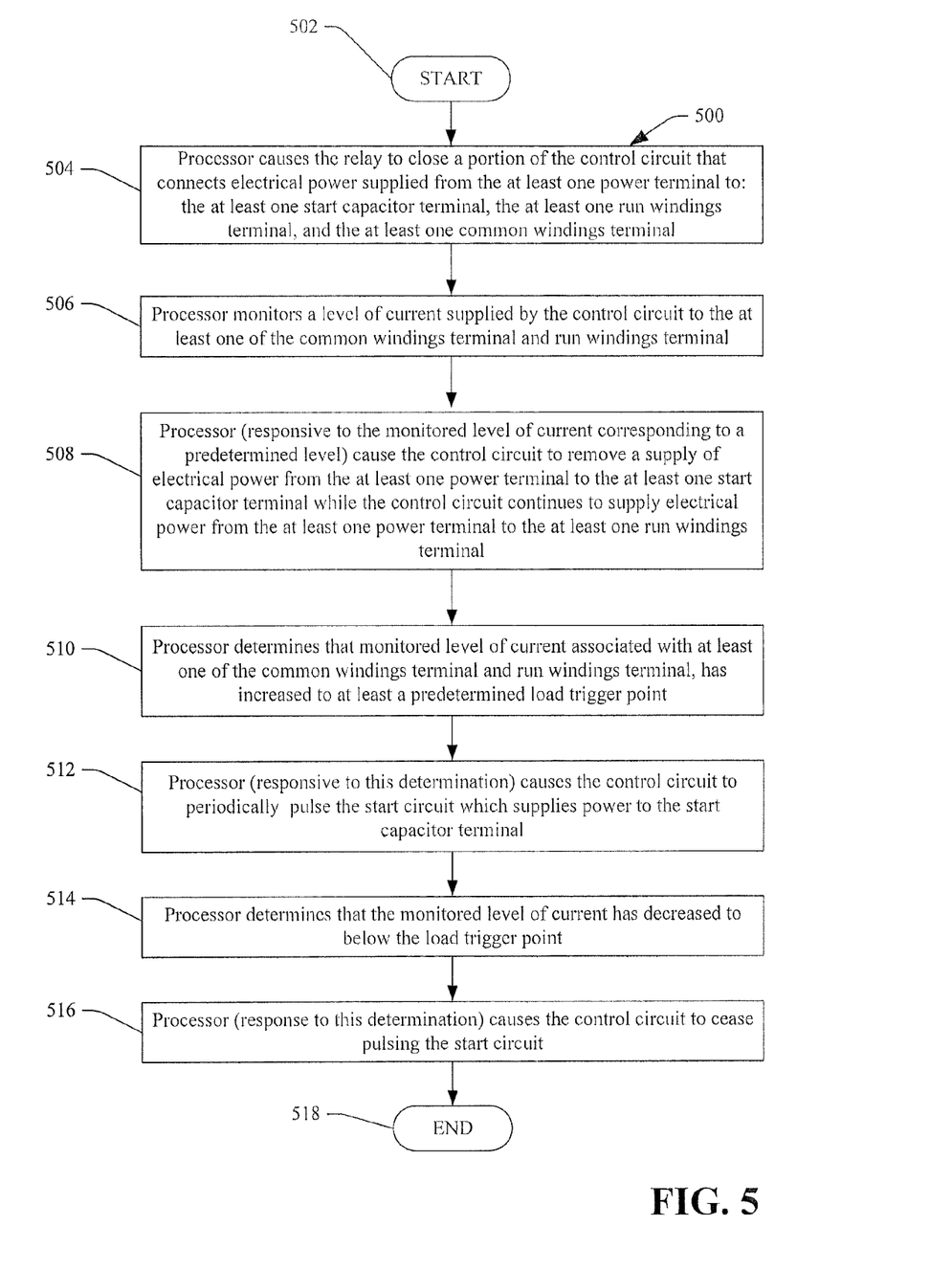
FIG. 5 is flow diagram that illustrates an example methodology of controlling a start circuit with an example motor power module.
Figure 6:
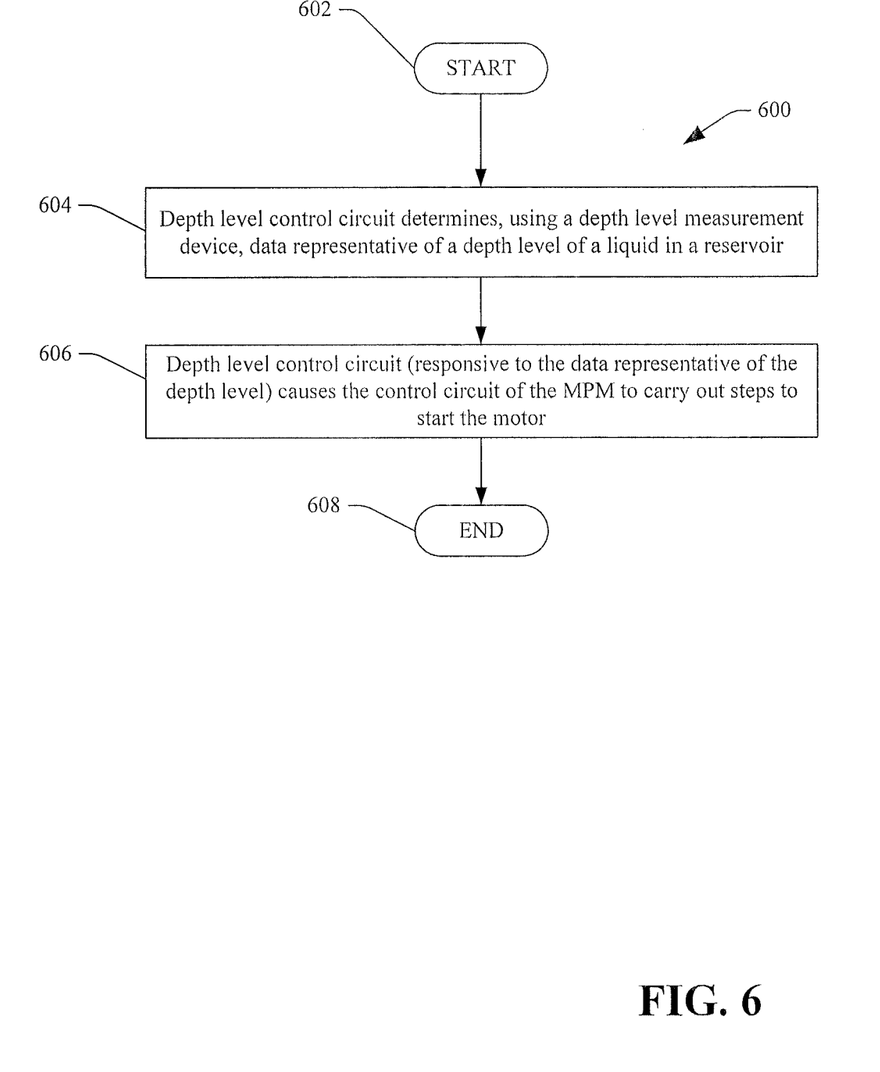
FIG. 6 is a flow diagram that illustrates an example methodology of operating an example motor power module in a waste water environment.
Figure 7:
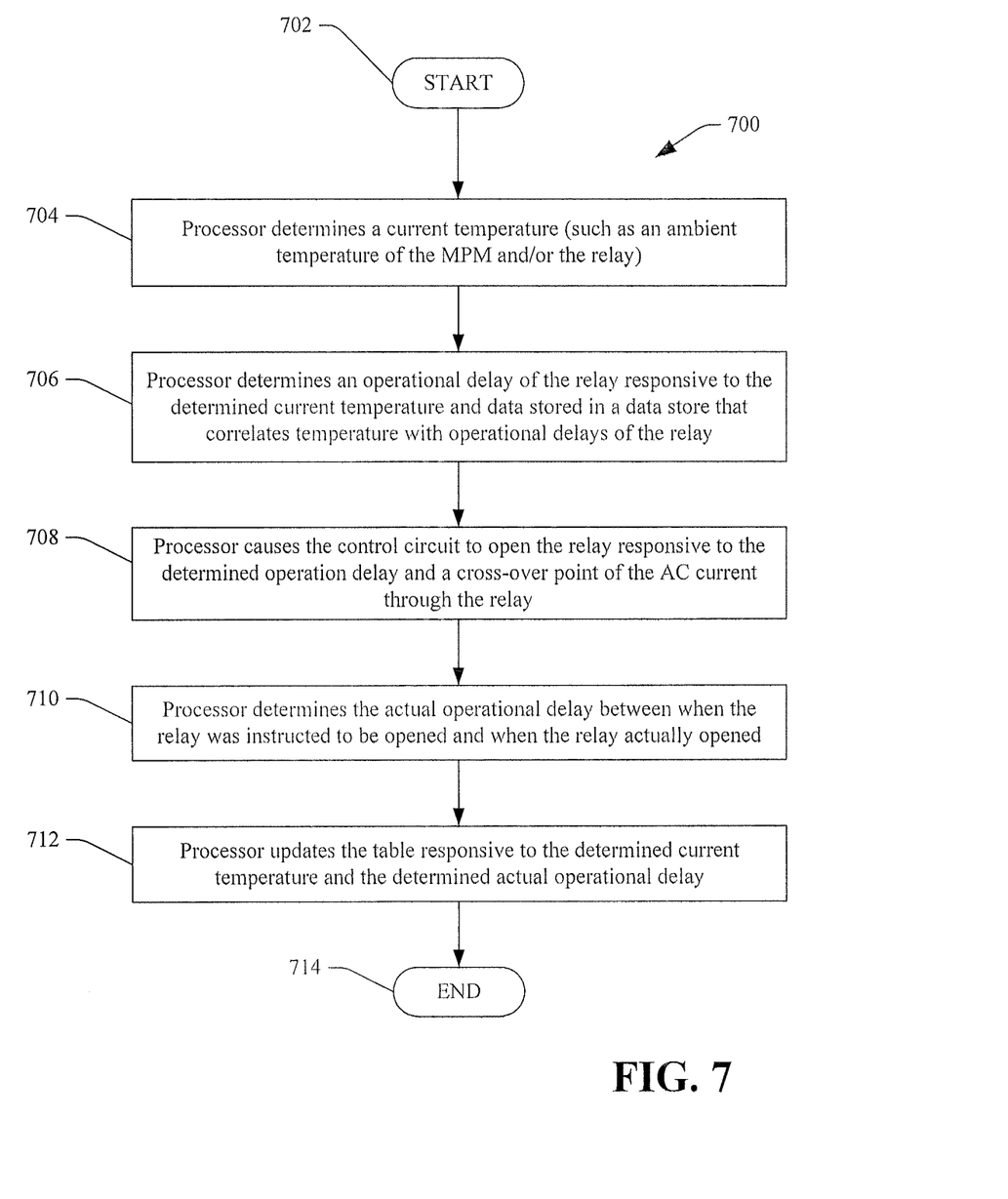
FIG. 7 is a flow diagram that illustrates an example methodology of timing the opening of a relay of the motor power module.

With reference now to FIGS. 5-7, various example methodologies are illustrated and described. While the methodologies are described as being a series of steps that are performed in a sequence, it is to be understood that the methodologies are not limited by the order of the sequence. For instance, some steps may occur in a different order than what is described herein. In addition, a step may occur concurrently with another step. Furthermore, in some instances, not all steps may be required to implement a methodology described herein.

Moreover, the steps described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 5, a methodology 500 that facilitates starting a motor with an example embodiment of a MPM is illustrated. In this methodology, the MPM includes a relay having a base end and a terminal end with a plurality of terminals. The MPM also includes, at least one control board mounted to the terminals of the relay with a cross-sectional area that generally corresponds to the cross-sectional area of the relay. In this example, the at least one control board includes a control circuit in operative connection with the plurality of terminals of the relay. The control circuit includes at least one power terminal which receives a connection of at least one AC power line. The control circuit also includes at least one run winding terminal which receives a connection to run windings of the motor. In addition, the control circuit includes at least common windings terminal that receives a connection to both the start and run windings of the motor. Further, the control circuit includes at least one start capacitor terminal that receives a connection to a start capacitor.

The methodology 500 begins at 502, and at 504 includes a step in which the at least one processor causes the relay to close a portion of the control circuit that connects electrical power supplied from the at least one power terminal to: the at least one start capacitor terminal, the at least one run windings terminal, and the at least one common windings terminal.

At step 506 the at least one processor monitors levels of current supplied by the control circuit to the at least one of the common windings terminal and run windings terminal. At step 508, the at least one processor (responsive to the monitored levels of current corresponding to a predetermined level) cause the control circuit to remove a supply of electrical power from the at least one power terminal to the at least one start capacitor terminal while the control circuit continues to supply electrical power from the at least one power terminal to the at least one run windings terminal.

Also, as discussed previously, the described MPM may carry out additional steps involving boosting the motor during periods of heavy load. In this regard the methodology may include a step 510 of determining with the processor that the monitored level of current associated with at least one of the common windings terminal and run windings terminal, has increased to at least a predetermined load trigger point. Responsive to this determination, the methodology may include a step 512 in which the at least one processor causes the control circuit to periodically pulse the start circuit which supplies power to the start capacitor terminal. The methodology may also include a step 514 in which the at least one processor determines that the monitored level of current has decreased to below the load trigger point and in response to this detection, in step 516 the at least one processor causes the control circuit to cease pulsing the start circuit. At 518 the methodology ends.

FIG. 6 illustrates a methodology 600 of operating the described MPM to trigger carrying out the method steps illustrated in FIG. 5 to start a motor. Here the control circuit of the MPM is in operative connection with a depth level control circuit. Methodology 600 begins at 602, at 604 the methodology 600 includes the depth level control circuit determining, through operation of a depth level measurement device, data representative of a depth level of a liquid in a reservoir. Then at 606 the methodology includes the depth level control circuit (responsive to the data representative of the depth level surpassing a predetermined threshold) causing the control circuit of the MPM to carry out steps to start the motor. At 608 the methodology ends.

FIG. 7 illustrates a methodology 700 of operating the described MPM to extend the life of the relay. Methodology 700 begins at 702, and at 704 includes a step in which the at least one processor determines a current temperature (such as an ambient temperature of the MPM and/or the relay). At 706 the methodology 700 includes the at least one processor determining an operational delay of the relay responsive to the determined temperature and data stored in a data store that correlates temperature with operational delays of the relay. At 708 the methodology includes the at least one processor causing the control circuit to open the relay responsive to the determined operation delay and a cross-over point of the AC current through the relay. At 710 the methodology includes the at least one processor determining the actual operation delay between when the relay was instructed to be opened and when the relay actually opened. At 712 the method includes the at least one processor updating the table responsive to the determined current temperature and the determined actual operational delay. At 714 the methodology ends.

It should be appreciated that the described processor may operate responsive to firmware (or software) stored in the processor or other computer readable media to cause the MPM to carry out the methodologies described previously. Also, it should be appreciated that such firmware may be stored on other forms of computer readable media, including CDs, DVDs, flash memory devices, hard drives or any other article that is operative to store computer executable instructions for use with the described processor. Additionally it should be appreciated that a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. An apparatus comprising:
  a module adapted to connect to a relay that includes a plurality of terminals, wherein the module includes:
    at least one control circuit that is adapted to connect to the plurality of terminals of the relay,
      wherein the control circuit includes at least one power terminal which receives a connection of at least one AC power line,
      wherein the control circuit includes at least one windings terminal which receives a connection to at least one of run windings, start windings or a combination thereof of a single phase AC motor, wherein the control circuit includes at least one start capacitor terminal that receives a connection to a start circuit including a start capacitor in operative connection with the start windings of the motor, wherein the control circuit is configured to control the relay to open and close portions of the control circuit that connect electrical power supplied from the at least one power terminal to the at least one start capacitor terminal and to the at least one windings terminal that supplies power to the run windings of the motor, wherein the control circuit is configured to monitor a usage of at least one of the start capacitor, the start windings or a combination thereof, wherein responsive to the monitored usage corresponding to at least a predetermined level, the control circuit is configured to at least temporarily remove a supply of electrical power from the at least one power terminal to the at least one start capacitor terminal while the control circuit continues to supply electrical power from the at least one power terminal to the at least one windings terminal that supplies power to the run windings of the motor.

2. The apparatus according to claim 1, wherein the control circuit is configured to monitor a level of current supplied by the control circuit to the at least one windings terminal, wherein responsive to the monitored level of current corresponding to a predetermined level, the control circuit is configured to remove a supply of electrical power from the at least one power terminal to the at least one start capacitor terminal while the control circuit continues to supply electrical power from the at least one power terminal to the at least one windings terminal that supplies power to the run windings of the motor, wherein responsive to the monitored level of current increasing to at least a predetermined load trigger point, the control circuit is configured to supply electrical power from the at least one power terminal to the at least one start capacitor terminal while the control circuit continues to supply electrical power from the at least one power terminal to the at least one windings terminal that supplies power to the run windings.

3. The apparatus according to claim 2, wherein responsive to the monitored level of current increasing to at least the predetermined load trigger point, the control circuit is configured to pulse the start circuit by periodically supplying electrical power from the at least one power terminal to the at least one start capacitor terminal.

4. The apparatus according to claim 1, wherein the at least one control circuit includes a user interface, wherein the user interface includes at least one processor, at least one input device and at least one output device, wherein the at least one output device is operable to output visual information indicative of whether the control circuit is in a state that is causing the motor to run, wherein the at least one input device is operable to enable a user to select an overload threshold level, wherein the at least one processor is configured to cause the control circuit to stop the motor responsive to the monitored level of current having increased to a level corresponding to the user selected overload threshold level.

5. The apparatus according to claim 1, further comprising the relay, wherein the relay includes a base end and a terminal end, wherein the terminal end includes a plurality of terminals extending from the terminal end, further comprising at least one control board mounted in supporting connection to the terminals, wherein the control board includes the control circuit.

6. The apparatus according to claim 5, further comprising a housing, wherein the housing includes an interior area, wherein the interior area includes at least one mounting surface operable to support internally mounted devices, wherein the relay is mounted to the mounting surface with the base end of the relay adjacent the mounting surface, wherein the relay is mounted between the at least one control board and the mounting surface.

7. The apparatus according to claim 6, further comprising the start capacitor mounted in the interior area of the housing and a pump external to the housing, wherein the pump includes the motor, wherein the pump is operable to move liquid out of a reservoir, further comprising a depth level control circuit mounted in the housing, wherein the depth level control circuit is operative configured to determine a depth level of the liquid, wherein responsive to the determined depth level of the liquid increasing to at least a predetermined level, the depth level control circuit is configured to cause the module to start the motor.

8. The apparatus according to claim 1, wherein the control circuit includes at least one processor, wherein the at least one processor is configured to determine a current temperature, wherein the at least one processor is configured to determine an operational delay of the relay responsive to the determined current temperature and data stored in a data store that correlates temperature with operational delays of the relay, wherein the at least one processor is configured to cause the relay to open responsive to the determined operational delay and a cross-over point of the AC current through the relay.

9. The apparatus according to claim 8, wherein the at least one processor is configured to determine an actual operational delay between when the relay was instructed to be open and when the relay opened in response thereto, wherein the at least one processor is configured to update the table responsive to the determined temperature and determined actual operational delay.

10. The apparatus according to claim 1, wherein the control circuit includes at least one processor, wherein the at least one processor is configured to monitor the usage of at least one of the start capacitor, the start windings or a combination thereof of the motor, wherein responsive to the monitored usage corresponding to a predetermined level, the at least one processor is configured to cause the control circuit to temporarily remove a supply of electrical power from the at least one power terminal to the at least one start capacitor terminal while the control circuit continues to supply electrical power from the at least one power terminal to the at least one windings terminal that supplies power to the run windings of the motor.

11. The apparatus according to claim 1, wherein the monitored usage includes an amount of time that electrical power has been supplied from the at least one power terminal to the at least one start capacitor terminal.

12. A method of controlling a single phase AC motor with a module including a relay and a control circuit in operative connection with a plurality of terminals of the relay, wherein the control circuit includes at least one power terminal which receives a connection of at least one AC power line, wherein the control circuit includes at least one windings terminal which receives a connection to at least one of start windings, run windings or a combination thereof of the motor, wherein the control circuit includes at least one start capacitor terminal that receives a connection to a start circuit that includes a start capacitor in operative connection with the start windings of the motor, the method comprising:

a) through operation of the control circuit, causing the relay to close a portion of the control circuit that connects electrical power supplied from the at least one power terminal to the at least one start capacitor terminal and the at least one windings terminal that supplies power to the run windings of the motor;
b) through operation of the control circuit, monitoring a usage of at least one of the start capacitor, the start windings, or a combination thereof of the motor; and
c) responsive to the monitored usage in (b) corresponding to at least a predetermined level, causing through operation of the control circuit, at least a temporary removal of a supply of electrical power from the at least one power terminal to the at least one start capacitor terminal while the control circuit continues to supply electrical power from the at least one power terminal to the at least one windings terminal that supplies power to the run windings of the motor.

13. The method according to claim 12, further comprising:
d) responsive to the monitored level of current decreasing to at least a predetermined level, causing through operation of the control circuit, removal of a supply of electrical power from the at least one power terminal to the at least one start capacitor terminal while the control circuit continues to supply electrical power from the at least one power terminal to the at least one windings terminal that supplies power to the run windings of the motor;
e) through operation of the control circuit, determining that the monitored level of current has increased to at least a predetermined load trigger point;
f) responsive to (e) through operation of the control circuit supplying electrical power from the at least one power terminal to the at least one start capacitor terminal while the control circuit continues to supply electrical power from the at least one power terminal to the at least one windings terminal that supplies power to the run windings of the motor;
g) through operation of the control circuit, determining that the monitored level of current has decreased to below the predetermined load trigger point;
h) responsive to (g) through operation of control circuit ceasing supplying electrical power to the start circuit.

14. The method according to claim 13, wherein (f) includes the control circuit pulsing the start circuit by periodically supplying electrical power from the at least one power terminal to the at least one start capacitor terminal, wherein (h) includes the control circuit ceasing pulsing the start circuit.

15. The method according to claim 12, wherein the at least one control circuit includes at least one processor and a user interface, wherein the user interface includes at least one input device and at least one output device, wherein the at least one output device is operable to output visual indicia indicative of whether the control circuit is in a state that is causing the motor to run, wherein the at least one input device is operable to enable a user to select a threshold level that triggers the control circuit to stop the motor, further comprising:
d) receiving through operation of the at least one input device an input from a user, which input is representative of an overload threshold level;
e) through operation of the at least one processor, monitoring the level of current supplied by the control circuit to the at least one windings terminal;
f) responsive to the monitored level of current increasing to the inputted overload threshold level, causing through operation of the at least one processor, the control circuit to remove a supply of electrical power from the at least one power terminal to the at least one windings terminal that supplies power to the run windings of the motor.

16. The method according to claim 12, wherein the motor is included in a pump in a reservoir, wherein (a) through (c) cause the pump to operate to move liquid out of a reservoir, further comprising:
d) determining with a depth level control circuit that a depth level of a liquid in the reservoir has increased to at least a predetermined level;
e) responsive to (d) causing through operation of the depth level control circuit, the module to carry out steps (a) through (c).

17. The method according to claim 12, wherein the control circuit includes at least one processor, further comprising:
d) through operation of the at least one processor, determining a current temperature;
e) through operation of the at least one processor, determining an operational delay of the relay responsive to the determined current temperature and data stored in a data store that correlates temperature with operational delays of the relay;
f) through operation of the at least one processor, causing the relay to open responsive to the operational delay determined in (e) and a cross-over point of the AC current through the relay.

18. The method according to claim 17, further comprising:
g) through operation of the least one processor, determining an actual operational delay between when the relay was instructed to be open in (f) and when the relay opened in response thereto;
h) through operation of the at least one processor, updating the table responsive to the current temperature determined in (d) and the actual operational delay determined in (g).

19. The method according to claim 12, wherein the control circuit includes the at least one processor, wherein (b) includes the at least one processor, monitoring usage of at least one of the start capacitor, the start windings, or a combination thereof of the motor.

20. The method according to claim 19, wherein in (b) the monitored usage includes an amount of time that electrical power has been supplied from the at least one power terminal to the at least one start capacitor terminal.

21. At least one processor readable medium comprising non-transitory processor executable instructions that when executed by at least one processor in a control circuit of a module, cause the at least one processor to carry out a method, wherein the module includes a relay and a control circuit in operative connection with a plurality of terminals of the relay, wherein the control circuit includes at least one power terminal which receives a connection of at least one AC power line, wherein the control circuit includes at least one windings terminal which receives a connection to at least one of start windings, run windings or a combination thereof of the motor, wherein the control circuit includes at least one start capacitor terminal that receives a connection to a start circuit that includes a start capacitor in operative connection with the start windings of the motor, the method comprising:
a) through operation of the at least one processor of the control circuit, causing the relay to close a portion of the control circuit that connects electrical power supplied from the at least one power terminal to the at least one start capacitor terminal and the at least one windings terminal that supplies power to the run windings of the motor;
b) through operation of the at least one processor, monitoring a usage of at least one of the start capacitor, the start windings or a combination thereof of the motor; and c) responsive to the monitored usage in (b) corresponding to at least a predetermined level, causing through operation of the at least one processor, the control circuit to at least temporarily remove a supply of electrical power from the at least one power terminal to the at least one start capacitor terminal while the control circuit continues to supply electrical power from the at least one power terminal to the at least one windings terminal that supplies power to the run windings of the motor.

22. An apparatus comprising:
at least one control circuit that is configured to operate a single phase AC motor having run windings and start windings, wherein the at least one control circuit is configured to control a first switch and a second switch to selectively provide electrical power to the start windings and run windings of the motor, wherein the at least one control circuit is configured to monitor a usage of the start windings, which monitored usage is based at least in part on a measure of the total current to the start and run windings, wherein responsive at least in part to the monitored usage of the start windings corresponding to at least a predetermined level, the at least one control circuit is configured to control the first switch to:
temporarily remove a supply of electrical power to the start windings while the at least one control circuit continues to permit the second switch to supply electrical power to the run windings of the motor.

23. The apparatus according to claim 22, further comprising at least one start capacitor in operative connection with the start windings of the motor, wherein the monitored usage of the start windings includes monitored usage of the at least one start capacitor by the at least one control circuit.

24. The apparatus according to claim 23, wherein the monitored usage of the start capacitor includes an amount of time that electrical power has been supplied to the at least one start capacitor.

25. The apparatus according to claim 22, wherein the first switch includes a triac and the second switch includes a relay, wherein the at least one control circuit includes the triac, wherein the control circuit is configured to cause the triac and the relay to operate to connect electrical power to the start windings and run windings of the motor, wherein the at least one control circuit is configured to cause the triac to temporarily remove the supply of electrical power to the start windings while the control circuit continues to permit electrical power to be supplied through the relay to the run windings of the motor.

26. The apparatus according to claim 25, further comprising a module and the relay, wherein the module includes the at least one control circuit therein, wherein the relay includes a terminal end and an opposed base end, wherein the relay extends in the module such that the terminal end is in operative connection with the at least one control circuit and the base end is operatively configured to directly mount to a support surface.

27. A method of operating a single phase AC motor having run windings and start windings, comprising:
a) through operation of at least one control circuit, causing at least one of a first switch, a second switch or a combination thereof to provide electrical power to the start windings and run windings of the motor;
b) through operation of the at least one control circuit, monitoring usage of the start windings, which monitored usage is based at least in part on the total current to the start and run windings;
c) through operation of the at least one control circuit responsive at least in part to the monitored usage of the start windings in (b) corresponding to at least a predetermined level, causing the first switch to temporarily remove a supply of electrical power to the start windings while permitting the second switch to continue to supply electrical power to the run windings of the motor.

28. The apparatus according to claim 22, wherein the at least one control circuit includes a single current sensor configured to monitor the usage of the start windings and the run windings, wherein the control circuit is configured to both: stop the motor responsive to the monitored level of current by the single current sensor having increased to a level corresponding to an overload threshold level; and to remove the supply of electrical power to the start windings responsive, at least in part to the monitored level of current by the single current sensor.

29. The apparatus according to claim 28, wherein the at least one control circuit is configured to remove the supply of electrical power to the start windings responsive at least in part to an amount of time that electrical power has been supplied to the start windings, wherein the at least one control circuit is configured to reapply a supply of electrical power to the start windings responsive at least in part to an amount of time that electrical power has been removed from the start windows.

30. The method according to claim 27, wherein in (b) the at least one control circuit includes a single current sensor that monitors the total current to the start and run windings, wherein (c) includes through operation of the at least one control circuit responsive at least in part to the monitored total current in (b) corresponding to at least a predetermined level, causing the first switch to temporarily remove a supply of electrical power to the start windings while permitting the second switch to continue to supply electrical power to the run windings of the motor, further comprising:
d) through operation of the at least one control circuit responsive at least in part to the monitored level of current in (b) having increased to a level corresponding to an overload threshold level, causing at least one of the first and second switches to operate to stop the motor by removing a supply of electrical power to the start and run windings.

* * * * *